(12) United States Patent
Herrada

(10) Patent No.: US 11,063,538 B2
(45) Date of Patent: Jul. 13, 2021

(54) GEAR MOTOR, ASSOCIATED WIPER SYSTEM AND ASSOCIATED CONTROL METHOD

(71) Applicant: Valeo Systèmes d'Essuyage, Le Mesnil Saint Denis (FR)

(72) Inventor: Jose Luis Herrada, Le Mesnil Saint Denis (FR)

(73) Assignee: Valeo Systèmes d'Essuyage, Le Mesnil Saint Denis (FR)

(*) Notice: Subject to any disclaimer, the term of this patent is extended or adjusted under 35 U.S.C. 154(b) by 0 days.

(21) Appl. No.: 16/462,734

(22) PCT Filed: Nov. 6, 2017

(86) PCT No.: PCT/EP2017/078360
§ 371 (c)(1),
(2) Date: May 21, 2019

(87) PCT Pub. No.: WO2018/091302
PCT Pub. Date: May 24, 2018

(65) Prior Publication Data
US 2020/0067432 A1    Feb. 27, 2020

(30) Foreign Application Priority Data

Nov. 21, 2016 (FR) ...................... 1661258

(51) Int. Cl.
*H02P 6/18* (2016.01)
*B60S 1/08* (2006.01)
(Continued)

(52) U.S. Cl.
CPC ............... *H02P 6/181* (2013.01); *B60S 1/08* (2013.01); *H02K 7/1166* (2013.01); *H02K 29/08* (2013.01); *H02P 2203/05* (2013.01)

(58) Field of Classification Search
CPC ........ H02K 1/27; H02K 11/215; H02K 7/116; H02K 29/08; H02P 6/16; H02P 27/08; B60S 1/08
See application file for complete search history.

(56) References Cited

U.S. PATENT DOCUMENTS 6,791,219 B1    9/2004  Eric et al.
9,825,563 B2*  11/2017  Estrada ..................... H02P 6/17
(Continued)

FOREIGN PATENT DOCUMENTS

DE    102009030954 A1    12/2009
EP        3051672 A1     8/2016
(Continued)

OTHER PUBLICATIONS

International Search Report and Written Opinion Issued in Corresponding PCT Application No. PCT/EP2017/078360, dated Feb. 21, 2018 (24 Pages with English Translation of International Search Report and Written Opinion).

*Primary Examiner* — Said Bouziane
(74) *Attorney, Agent, or Firm* — Osha Bergman Watanabe & Burton LLP

(57) ABSTRACT

A wiper system including a brushless DC electric motor having a rotor, a stator having coils for electromagnetically exciting the rotor, a device for determining the angular position of the rotor with respect to the stator, a control unit configured to generate control signals for supplying power to the electromagnetic excitation coils according to the angular position of the rotor determined by the device for determining the angular position of the rotor, a reduction gear mechanism linked, on one side, to the rotor of the electric motor and, on the other side, to an output shaft that is intended to be linked to an external mechanism. The rotor includes at least one Hall effect sensor associated with a control magnet that rotates with the rotor and the gear motor (Continued)

also having a processing unit connected to the device for determining the angular position of the rotor.

19 Claims, 7 Drawing Sheets

(51) Int. Cl.
*H02K 7/116* (2006.01)
*H02K 29/08* (2006.01)

(56) References Cited

U.S. PATENT DOCUMENTS

| 2004/0108789 A1* | 6/2004 | Marshall | H02K 1/24 |
| | | | 310/216.016 |
| 2009/0179603 A1* | 7/2009 | Chen | H02P 6/20 |
| | | | 318/400.33 |
| 2009/0322269 A1* | 12/2009 | Kondo | H02P 6/16 |
| | | | 318/400.34 |
| 2010/0283417 A1* | 11/2010 | Holzmann | G01D 5/2451 |
| | | | 318/400.13 |
| 2013/0104386 A1* | 5/2013 | Savio | H02P 21/0003 |
| | | | 29/598 |
| 2015/0162860 A1* | 6/2015 | Bian | H02P 6/16 |
| | | | 318/400.07 |
| 2016/0241108 A1* | 8/2016 | Kimura | H02K 1/2753 |

FOREIGN PATENT DOCUMENTS

| WO | 2011144456 A1 | 11/2011 |
| WO | 201593056 A1 | 6/2015 |

* cited by examiner

GEAR MOTOR, ASSOCIATED WIPER SYSTEM AND ASSOCIATED CONTROL METHOD

FIELD OF DISCLOSURE

The present invention relates to a gear motor and in particular a gear motor for motor vehicle wiper systems.

BACKGROUND

Gear motors are essentially composed of an electric motor coupled to a reduction gear mechanism whose function is to gear down the speed thereof to obtain a significant rotational transmission torque.

Different types of electric motors can be used in a gear motor, and in particular the brushless DC electric motors which offer many advantages such as a long life, a reduced bulk and lower consumption, as well as a low sound level.

However, the control of the electric motors is more complex compared to the electric motors with brushes because, for this control to operate well, it is necessary to accurately know the angular position of the rotor of the brushless DC electric motor.

In effect, such electric motors comprise electromagnetic excitation coils arranged on the stator and supplied with alternating current via an inverter to make it possible to drive permanent magnets arranged on the rotor.

Now, in order to be able to switch over the switches of the inverter and therefore the power supply to the electromagnetic coils at optimal instants to make it possible to obtain the desired driving of the rotor, it is necessary to know the position of the rotor at least by segments with accuracy to a few points at the time of the state switchover (generally, for a trapezoidal excitation, six switchovers on each revolution of the rotor).

FIG. 1a shows a diagram of an angular detection device for the rotor of an electric motor comprising three Hall effect sensors according to the state of the art. As can be seen in this figure, three Hall effect sensors denoted H1, H2 and H3 are arranged on the stator ST around a control magnet AC, for example an annular magnet, secured to the DC electric motor whose single axis X can be seen in FIG. 1a. The control magnet AC comprises two poles denoted S for the south pole and N for the north pole.

The three Hall effect sensors H1, H2 and H3 are distributed angularly at 120° to one another so as to obtain the six instants of switchover of the electromagnetic excitation coil per cycle corresponding to an angle of rotation of 60° of the rotor.

FIG. 1b represents, in its top part, the signals from the three Hall effect sensors H1, H2 and H3 and, in its bottom part, the power supply signals to the electromagnetic excitation coils in a 360° cycle of the rotor. The cycle is divided into 6 steps of 60° delimited by the vertical dotted lines.

In a first step denoted 1, going from 0 to 60°, corresponding to a high signal from the sensor H3 and to a low signal from the sensors H1 and H2, the current switches from the phase A to the phase B (the signal corresponding to the phase A is at 1, the signal corresponding to the phase B is at −1 and the signal corresponding to the phase C is at 0).

In a second step denoted 2, going from 60° to 120°, corresponding to a high signal from the sensors H2 and H3 and to a low signal from the sensor H1, the current switches from the phase A to the phase C (the signal corresponding to the phase A is at 1, the signal corresponding to the phase B is at 0 and the signal corresponding to the phase C is at −1).

In a third step denoted 3, going from 120° to 180°, corresponding to a high signal from the sensor H2 and to a low signal from the sensors H1 and H3, the current switches from the phase B to the phase C (the signal corresponding to the phase B is at 1, the signal corresponding to the phase A is at 0 and the signal corresponding to the phase C is at −1).

In a fourth step denoted 4, going from 180° to 240°, corresponding to a high signal from the sensors H1 and H2 and to a low signal from the sensor H3, the current switches from the phase B to the phase A (the signal corresponding to the phase B is at 1, the signal corresponding to the phase C is at 0 and the signal corresponding to the phase A is at −1).

In a fifth step denoted 5, going from 240° to 300°, corresponding to a high signal from the sensor H1 and to a low signal from the sensors H2 and H3, the current switches from the phase C to the phase A (the signal corresponding to the phase C is at 1, the signal corresponding to the phase B is at 0 and the signal corresponding to the phase A is at −1).

In a sixth step denoted 6, going from 300° to 360°, corresponding to a high signal from the sensors H1 and H3 and to a low signal from the sensor H2, the current switches from the phase C to the phase B (the signal corresponding to the phase C is at 1, the signal corresponding to the phase A is at 0 and the signal corresponding to the phase B is at −1).

Thus, the use of three Hall effect sensors H1, H2 and H3 makes it possible to accurately determine the six positions of the rotor corresponding to the six instants of change of switching of the electromagnetic excitation coils.

Such a solution therefore seems costly because of the high number of sensors necessary for the control of the electric motor.

In order to reduce the number of sensors required, it is also known practice, for the determination of the position of the rotor, to use a sensorless method based on the measurement of the back-electromotive forces of the excitation coils of the stator.

However, such a solution requires a startup of the brushless DC electric motor in synchronous mode until the speed of rotation of the rotor and therefore the back-electromotive forces are sufficient to be measured and to be able to be used to control the switching instants.

Now, such a startup in synchronous mode is possible only for applications where the load is low on startup and relatively known (for example for the control of a fan). It is therefore understood that this solution is not applicable to a gear motor for a motor vehicle wiper system which requires a load and a force couple that are high on startup and which may be started up with almost zero loads (as in the case of windscreens that are wet) or with high loads (as in the case of wipers that are stuck because of ice or snow).

Furthermore, an associated problem is how to determine the position of the output shaft of the reduction gear mechanism on which the wiper system is arranged to be able to decide on the control to be applied to the electric motor and in particular its direction of rotation. For that, it is known practice to use an additional sensor, for example an analog angular sensor, situated at the output shaft of the reduction gear mechanism. The cost of such a sensor is also high and contributes to increasing the overall cost of the gear motor.

The present invention therefore aims to provide a solution that makes it possible to reduce the overall cost of a gear motor while allowing the wiper system to be effectively controlled and to operate well.

SUMMARY OF THE INVENTION

To this end, the present invention relates to a gear motor, in particular for a wiper system, comprising:

a brushless DC electric motor comprising:
a rotor,
a stator having coils for electromagnetically exciting the rotor,
a device for determining the angular position of the rotor relative to the stator,
a control unit configured to generate control signals for powering the electromagnetic excitation coils as a function of the angular position of the rotor determined by the device for determining the angular position of the rotor,
a reduction gear mechanism linked on one side to the rotor of the electric motor and on the other side to an output shaft intended to be linked to an external mechanism, in particular a wiper system, the reduction gear mechanism having a predefined reduction ratio,
said device for determining the angular position of the rotor comprises at least one Hall effect sensor associated with a control magnet secured in rotation to the rotor and the gear motor also comprises a processing unit connected to the device for determining the angular position of the rotor and configured to determine the angular position of the output shaft from the angular position of the rotor determined by taking account of the predefined reduction ratio of the reduction gear mechanism.

The determination of the angular position of the output shaft from the angular position of the rotor makes it possible to dispense with an accurate position sensor at said output shaft.

According to another aspect of the present invention, the device for determining the angular position of the rotor comprises two Hall effect sensors associated respectively with a control magnet secured in rotation to the rotor.

The use of two Hall effect sensors makes it possible to determine the direction of rotation of the rotor.

According to a supplementary aspect of the present invention, the control magnet comprises a number of pairs of poles greater than the number of pairs of magnetic poles of the rotor of the brushless DC electric motor.

According to an additional aspect of the present invention, the device for determining the angular position of the rotor comprises a single Hall effect sensor associated with a control magnet comprising a number of pairs of poles equal to three times the number of pairs of magnetic poles of the rotor of the electric motor, the poles of the control magnet being configured to be in phase with the magnetic poles of the rotor of the electric motor so that the changes of states of the Hall effect sensor are synchronized with the changes of state of the control signals generated by the control unit for powering the electromagnetic excitation coils.

Such a configuration makes it possible to drive the electric motor with a single Hall effect sensor.

According to another aspect of the present invention, the device for determining the angular position of the rotor comprises two Hall effect sensors associated with a control magnet comprising a number of pairs of poles equal to three times the number of pairs of magnetic poles of the rotor of the electric motor, the two sensors being offset by an angle of 30°, the magnetic poles of the rotor of the control magnet being configured to be in phase with the magnetic poles of the rotor so that the changes of states of one of the Hall effect sensors are synchronized with the changes of state of the control signals generated by the control unit for powering the electromagnetic excitation coils.

According to a supplementary aspect of the present invention, the device for determining the angular position of the rotor comprises two Hall effect sensors, the first Hall effect sensor being associated with a first control magnet comprising a number of pairs of poles equal to three times the number of pairs of magnetic poles of the rotor of the electric motor, the second Hall effect sensor being associated with a second control magnet comprising a number of pairs of poles equal to nine times the number of pairs of magnetic poles of the rotor of the electric motor, the poles of the first control magnet being configured to be in phase with the magnetic poles of the rotor of the electric motor so that the changes of states of the first Hall effect sensor are synchronized with the changes of state of the control signals generated by the control unit for powering the electromagnetic excitation coils, the second Hall effect sensor and the second control magnet being configured so that the changes of state of the first Hall effect sensor occur midway in time between two changes of state of the second Hall effect sensor.

According to an additional aspect of the present invention, the device for determining the angular position of the rotor relative to the stator is configured to:
determine the angular position of the rotor from the signals from the Hall effect sensor or sensors for speeds of rotation of the rotor below a predetermined threshold, and to
determine the angular position of the rotor from a measurement of the back-electromotive forces deriving from the electromagnetic excitation coils for speeds of rotation of the rotor equal to or above the predetermined threshold.

The use of the back-electromotive forces makes it possible to enhance the accuracy of the determination of the position of the rotor.

According to another aspect of the present invention, the back-electromotive force of the at least one unpowered electromagnetic excitation coil is measured and transmitted to the device for determining the angular position of the rotor, said device for determining the angular position of the rotor being configured to compare the measured value of the back-electromotive force to a predetermined threshold associated with a predetermined position of the rotor.

According to a supplementary aspect of the present invention, the device for determining the angular position of the rotor is configured to correct the angular measurement deriving from the Hall effect sensor or sensors on the basis of the measurement of the back-electromotive forces of the electromagnetic excitation coils so as to calibrate the Hall effect sensor or sensors on the basis of said measurements of the back-electromotive forces.

According to an additional aspect of the present invention, the gear motor also comprises an additional magnet called output magnet secured in rotation to the output shaft and at least one additional Hall effect sensor called output sensor associated with the output magnet, the at least one output sensor and the output magnet being configured so that the at least one output sensor detects a first position of the output magnet corresponding to a first position of abutment of the external mechanism intended to be linked to the output shaft and a second position of the output magnet corresponding to a second position of abutment of the external mechanism intended to be linked to the output shaft, the at least one output sensor being connected to the control unit and said control unit being configured to generate the control signals as a function also of the signals from said at least one output sensor.

The present invention relates also to a wiper system, in particular for a motor vehicle, comprising a gear motor as described previously.

The present invention relates also to a method for controlling an electric motor of a gear motor, in particular for wiper systems, the gear motor comprising:

a brushless DC electric motor comprising:
a rotor,
a stator having coils for electromagnetically exciting the rotor,
a reduction gear mechanism linked on one side to the rotor of the electric motor and on the other side to an output shaft intended to be linked to an external mechanism, in particular a wiper system, the reduction gear mechanism having a predefined reduction ratio,
a device for determining the angular position of the rotor relative to the stator comprising at least one Hall effect sensor associated with a control magnet secured in rotation to the rotor,
said method comprising the following steps:
(a) for speeds of rotation of the rotor below a predetermined threshold:
the angular position of the rotor is determined on the basis of the signals deriving from the Hall effect sensor or sensors,
(b) for speeds of rotation of the rotor equal to or above the predetermined threshold,
the angular position of the rotor is determined on the basis of a measurement of the back-electromotive forces deriving from the electromagnetic excitation coils,
control signals are generated for powering the electromagnetic excitation coils as a function of the angular position of the rotor determined in preceding steps,
the angular position of the output shaft is determined on the basis of the angular position of the rotor determined in preceding steps and by taking account of the predefined reduction ratio of the reduction gear mechanism.

According to another aspect of the present invention, the angular measurement of the Hall effect sensor or sensors is corrected on the basis of the measurement of the back-electromotive forces deriving from the electromagnetic excitation coils of the rotor.

According to a supplementary aspect of the present invention, the gear motor also comprises an additional magnet called output magnet arranged at the output shaft of the reduction gear mechanism and at least one additional Hall effect sensor called output sensor associated with the output magnet, the at least one output sensor and the at least one output magnet being configured so that the at least one output sensor detects a first position of the output magnet when the output shaft is in a first position corresponding to a first position of abutment of the external mechanism intended to be linked to the output shaft and detects a second position of the output magnet when the output shaft is in a second position corresponding to a second position of abutment of the external mechanism intended to be linked to the output shaft and wherein the step of generation of the control signals for powering the electromagnetic excitation coils is performed also as a function of the signals from said at least one output sensor.

Other features and advantages of the invention will emerge from the following description, given as an example and in a nonlimiting manner, with respect to the attached drawings in which:

BRIEF DESCRIPTION OF DRAWINGS

In all the figures, the elements that are identical bear the same reference numbers.

DETAILED DESCRIPTION

The following embodiments are examples. Although the description refers to one or more embodiments, that does not necessarily mean that each reference relates to the same embodiment or that the features apply only to a single embodiment. Simple features of different embodiments can also be combined or interchanged to provide other embodiments.

In the description, some elements or parameters may be indexed, such as, for example, first element or second element and first parameter and second parameter or even first criterion and second criterion, etc. In this case, it is a simple indexing to differentiate and designate elements or parameters or criteria that are similar but not identical. This indexing does not imply a priority of one element, parameter or criterion over another and such designations can easily be interchanged without departing from the scope of the present description. Nor does this indexing imply an order in time, for example for assessing particular criteria.

Figure 1A:
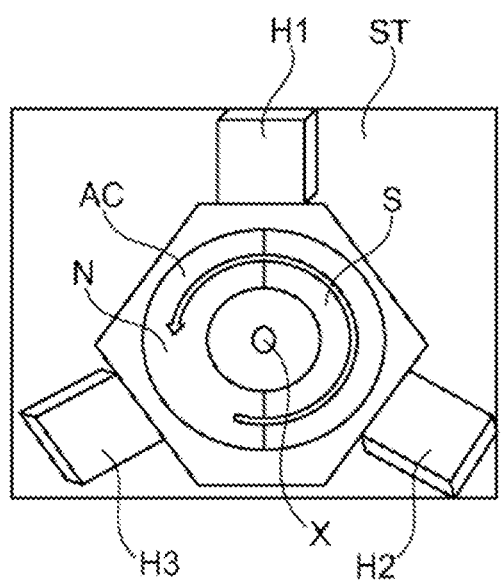
FIG. 1a represents a diagram of an angular detection device for the rotor of an electric motor comprising three Hall effect sensors according to the state of the art.
Figure 1B:
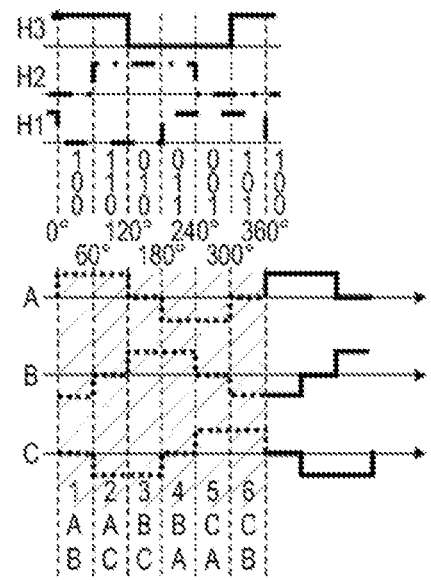
FIG. 1b represents a diagram of the signals supplied by the sensors of FIG. 1a and of the control signals of the electromagnetic excitation coils of the electric motor.
Figure 2:
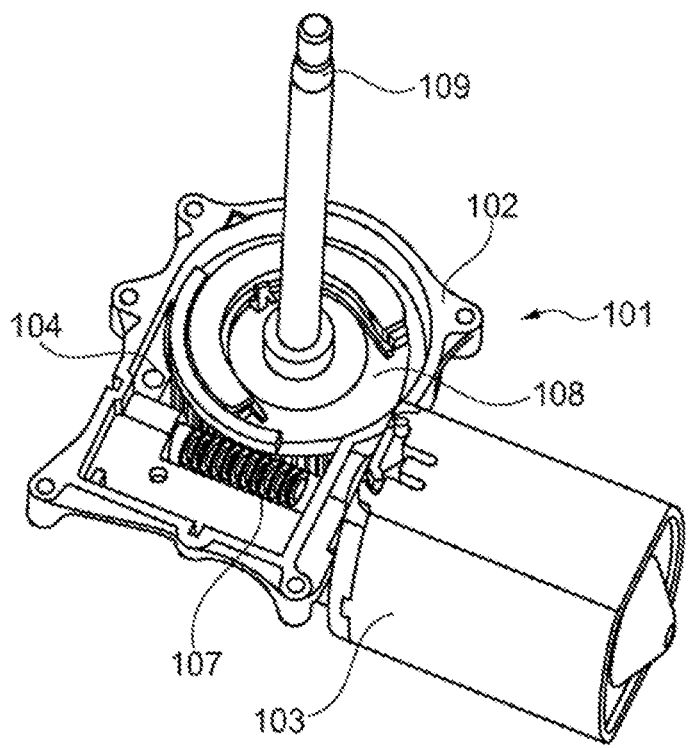
FIG. 2 represents a diagram of a gear motor.

FIG. 2 represents an example of a gear motor 101 intended to equip a motor vehicle wiper system.

The gear motor 101 comprises a casing 102 on which is mounted an electric motor 103 coupled to a reduction gear mechanism 104 having a predefined reduction ratio, for example, typically, a ratio of 1/69.

The reduction gear mechanism 104 comprises a worm screw 107 driven in rotation by the electric motor 103 and a toothed wheel 108 secured to an output shaft 109 mounted to be rotationally mobile on an axis substantially at right angles to the axis of rotation of the worm screw 107.

The reduction gear mechanism 104 is arranged in such a way that the worm screw 107 cooperates by meshing with the toothed wheel 108, such that the output shaft 109 is able to be driven indirectly in rotation by the electric motor 103.

The output shaft 109 is generally linked either directly or via a linkage system to a wiper arm on which a windscreen wiper is fixed.

In the context of the present invention, the electric motor 103 is a brushless DC electric motor.

Figure 3A:
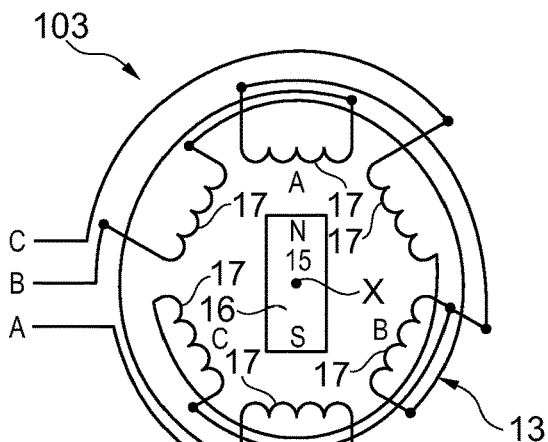
FIGS. 3a, 3b and 3c represent functional diagrams of an electric motor.

As represented in FIG. 3*a* which represents a schematic view in transverse cross section, the electric motor 103 comprises a stator 13 of cylindrical form, at the center of which is housed a rotor 15.

The rotor 15 is mounted to be rotationally mobile about the central axis X of the electric motor 103 and comprises a permanent magnet 16 whose magnetic poles are represented by the letters N for the north pole and S for the south pole. However, the present invention is not limited to a permanent magnet 16 of the rotor 15 comprising one pair of magnetic poles but extends also to a permanent magnet comprising a greater number of pairs of magnetic poles.

The stator 13 comprises electromagnetic excitation coils 17 arranged around the rotor 15. The electromagnetic excitation coils 17 are distributed evenly over the circumference of the stator 13. The electric motor 103 is, here, a three-phase motor whose phases are denoted A, B and C. There are six electromagnetic excitation coils 17 (two coils being associated to form a phase) and they are linked according to a star or Y configuration.

Obviously, a different number of electromagnetic excitation coils 17 and a different configuration, for example delta configuration, can also be used.

Figure 3B:
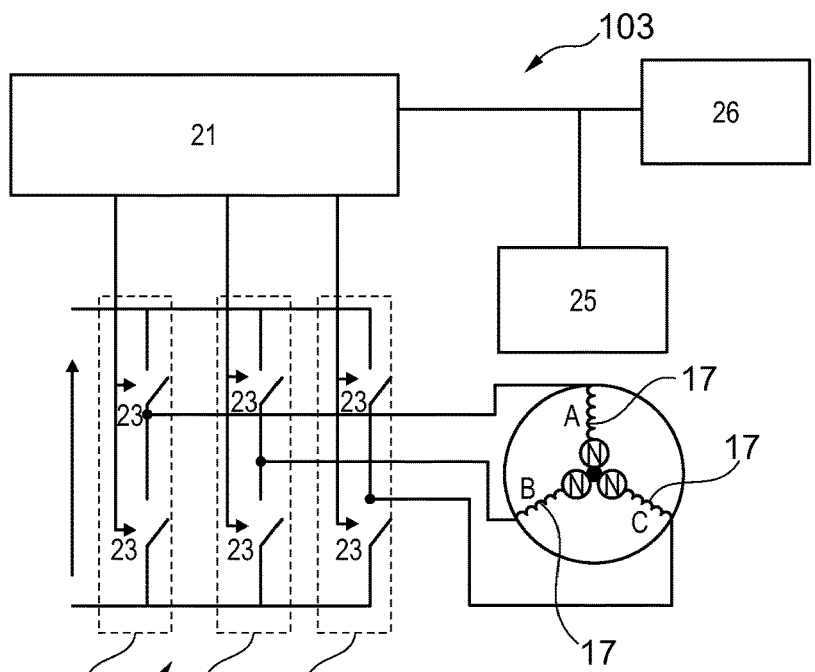

As represented in FIG. 3*b*, the electromagnetic excitation coils 17 can be powered by an inverter 19 managed by a control unit 21.

The inverter 19 comprises, for example, three branches denoted B1, B2 and B3, intended to power the respective phases A, B and C of the stator 13.

Each branch B1, B2 or B3 comprises two switches 23, the switching of which drives the powering or non-powering of the electromagnetic excitation coils 17 of the associated phase A, B or C.

Figure 3C:
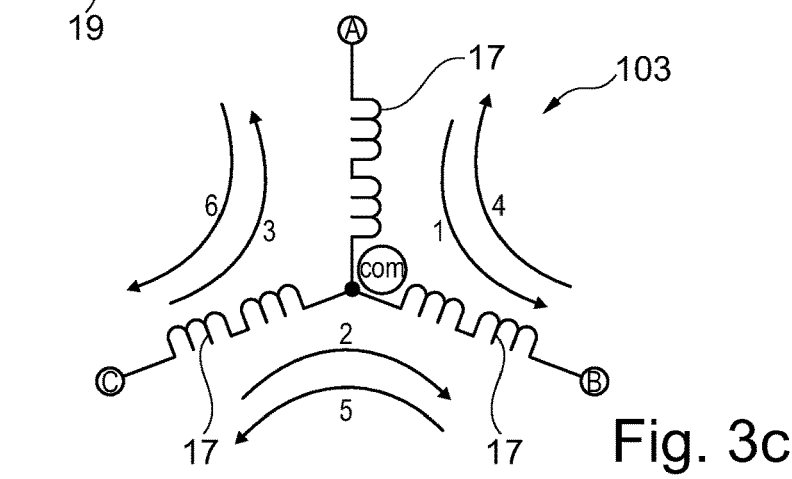

The switches 23 of the inverter 19 are driven by the control unit 21 to obtain a sequence of six switching steps represented by arrows numbered from 1 to 6 in FIG. 3*c*.

The first step 1 corresponds to the switching of the current from the phase A to the phase B, the second step 2 corresponds to the switching of the current from the phase C to the phase B, the third step 3 corresponds to the switching of the current from the phase C to the phase A, the fourth 4 corresponds to the switching of the current from the phase B to the phase A, the fifth step 5 corresponds to the switching of the current from the phase B to the phase C and the sixth step 6 corresponds to the switching of the current from the phase A to the phase C.

The six switching steps correspond to an electrical 360° rotation, that is to say a complete 360° rotation of the rotor 15 in the case where the permanent magnet 16 comprises a single pair of magnetic poles, here called pair of poles of the motor. In the case of a permanent magnet 16 comprising two pairs of magnetic poles, the six switching steps, corresponding to electrical 360°, correspond to a rotation of 180° of the rotor 15 and in the case of a permanent magnet 16 comprising three pairs of poles, the six switching steps, corresponding to electrical 360°, correspond to a 120° rotation of the rotor 15. The transition from one switchover to another therefore takes place on each rotation by an electrical 60° angle of the rotor 15.

On each step, the current switches through two phases while the third has a floating potential. The sequence of the six switching steps allows for the creation of a rotating magnetic field at the level of the stator 13 which makes it possible to drive the rotor 15 in rotation.

Although the six-step switching scheme is the best known with a 120° phase conduction and a 60° non-excitation, the present invention is not limited to just this one switching scheme but extends also to other types of switching, for example a 180° or intermediate phase conduction or different apportioning of excitation during the conduction that can range up to a sinusoidal progression.

The electric motor 103 also comprises a device for determining the angular position of the rotor 25 (see FIG. 3*b*) connected to the control unit 21 to allow the control unit 21 to determine the different switching instants and accordingly control the switches 23 of the inverter 19.

The device for determining the angular position of the rotor 25 is configured to determine the position of the rotor 15 relative to the stator 13 on the basis of at least one Hall effect sensor associated with a control magnet secured in rotation to the rotor 15.

The duly determined angular position of the rotor 15 is then transmitted by the device 25 for determining the angular position of the rotor 15 to the control unit 21 to make it possible to determine the switching instants of the inverter 19.

Furthermore, the gear motor 101 also comprises a processing unit 26 connected to the device 25 for determining the angular position of the rotor 15 and to the control unit 21 and configured to determine the angular position of the output shaft 109 on the basis of the angular position of the rotor 15 determined by taking account of the predefined reduction ratio of the reduction gear mechanism 104. The angular position of the output shaft 109 is then used by the control unit 21 to determine the speed of rotation to be applied to the rotor 15 and in particular to determine the instants when the wiper arm arrives in a position of abutment and for which the direction of rotation of the electric motor 103 must be reversed.

1) Determination of the Switching Instants of the Inverter 19

A) FIRST EMBODIMENT

A Single Hall Effect Sensor 27

Figure 4:
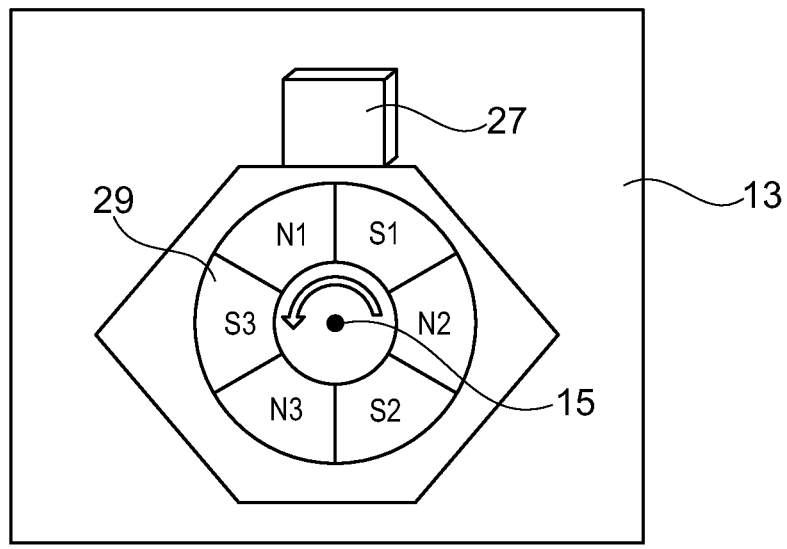
FIG. 4 represents a diagram of a Hall effect sensor associated with a control magnet according to a first embodiment.
Figure 5:
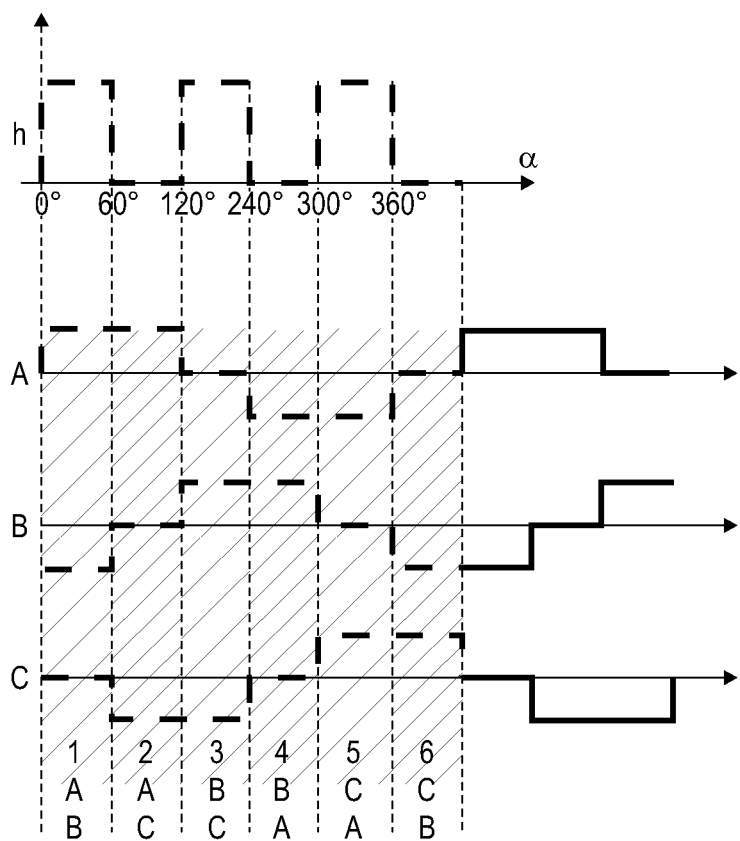
FIG. 5 represents a graph of the signal supplied by the Hall effect sensor of FIG. 4 as a function of the angular position of the rotor as well as the control signals of the electromagnetic excitation coils.

Referring to FIGS. 4 and 5, according to a first embodiment, the electric motor 103 comprises a single Hall effect sensor 27. This single sensor 27 is used by the device 25 for determining the angular position of the rotor 15, doing so in particular to determine the position of the rotor 15 for the low speeds of rotation, that is to say below a predetermined threshold, for example for speeds below 10% of the maximum speed of the electric motor 103. This here concerns the startup phase of the brushless DC electric motor 103.

For the speeds of rotation equal to or above the predetermined threshold, that is to say after the startup phase, the device 25 for determining the angular position of the rotor 15 can determine the angular position of the rotor 15 on the basis of the back-electromotive forces measured at the electromagnetic excitation coils 17.

The back-electromotive force is measured at a coil 17 that is not powered. For example, in the case of the step 1 of FIG. 3c, the current is transmitted from the phase A to the phase B so that the back-electromotive force is measured on the electromagnetic excitation coil 17 associated with the phase C. The measurement of the back-electromotive force is then transmitted to the device 25 for determining the angular position of the rotor 15.

The device 25 for determining the angular position of the rotor 15 then compares the measured value of the back-electromotive force to a predetermined threshold associated with a predetermined position of the rotor 15. For example, in the case of a symmetrical power supply, the switching instant corresponds to the zero crossing (transition from a positive level to a negative level or vice versa) of the voltage value of the back-electromotive force at the terminals of the unpowered electromagnetic excitation coil 17.

In addition, the measured back-electromotive forces can be used to correct, even calibrate, the Hall effect sensor 27.

According to a variant, it is possible to continue to exploit the position of the rotor 15 determined on the basis of the signals delivered by the Hall effect sensor 29 even for the speeds of rotation equal to or above the predetermined threshold.

The Hall effect sensor 27 is arranged at the level of the stator 13 and is associated with a control magnet 29 secured in rotation to the rotor 15 as represented in FIG. 4.

The control magnet 29 has a number of magnetic poles equal to three times the number of magnetic poles of the rotor 15. In the present case, the number of poles of the control magnet 29 therefore comprises six magnetic poles denoted N1, N2 and N3 for the north poles and S1, S2 and S3 for the south poles, as represented in FIG. 4. Each magnetic pole of the control magnet 29 occupies an angular segment of 60°.

Because of the six magnetic poles of the control magnet 29, the Hall effect sensor 27 can detect a precise angular position of the rotor every 60°. The electric motor 103 is therefore configured so that the changes of state of the signal supplied by the single Hall effect sensor 27 correspond to the changes of switching of the inverter 19 as represented in the graph of FIG. 5.

In effect, FIG. 5 represents, in its top part, the signal h deriving from the Hall effect sensor 27 as a function of the angular position a of the rotor 15.

The six steps corresponding to the switching cycle of the electromagnetic excitation coils 17 are also represented in the bottom part of FIG. 5.

The changes of state of the signal h deriving from the Hall effect sensor 27 therefore make it possible to determine the instants at which the changes of switching of the inverter 19 must be applied.

B) SECOND EMBODIMENT

Two Hall Effect Sensors 27a and 27b According to a First Configuration

Figure 6:
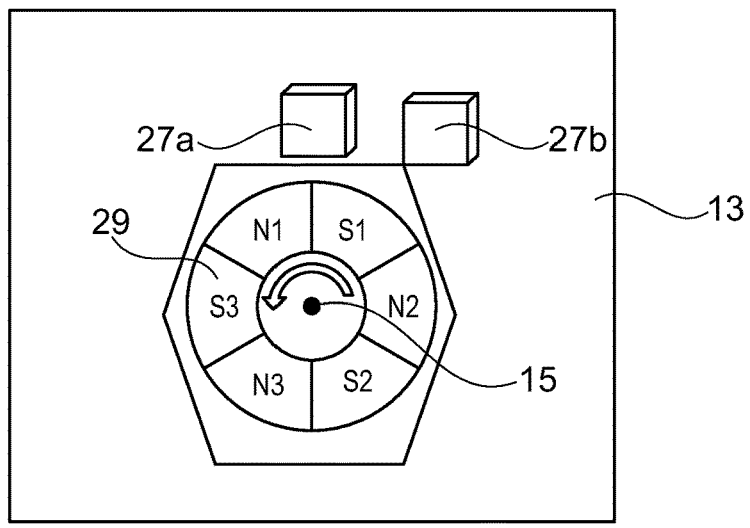
FIG. 6 represents two Hall effect sensors associated with a control magnet according to a second embodiment.
Figure 7:
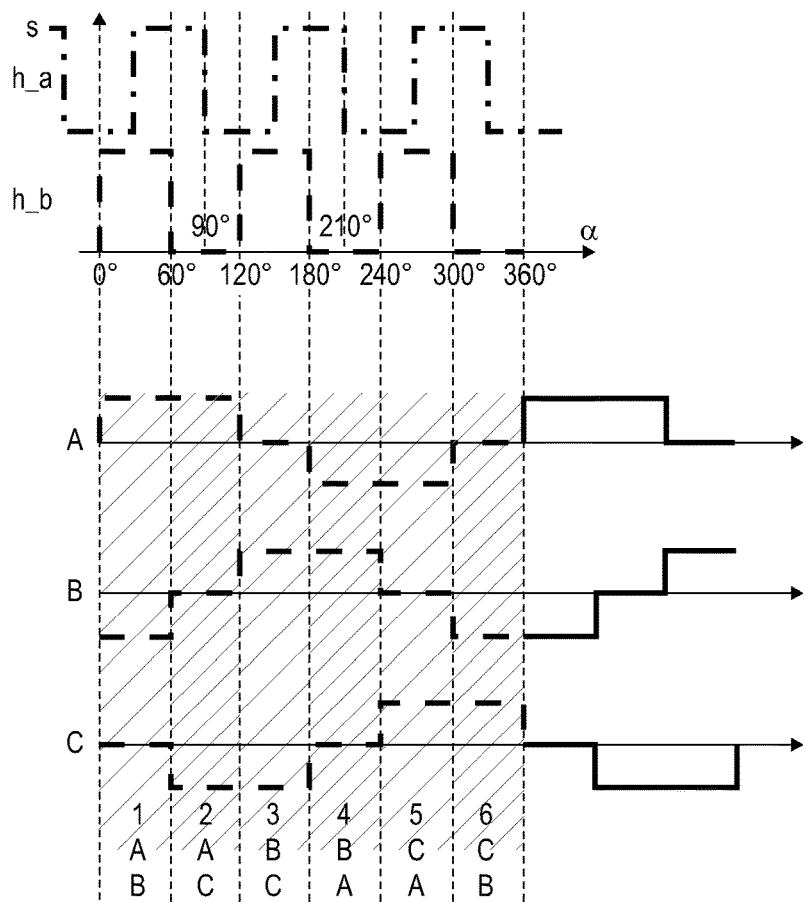
FIG. 7 represents a graph of the signals supplied by the Hall effect sensors of FIG. 6 as a function of the angular position of the rotor as well as the control signals of the electromagnetic excitation coils.

According to a second embodiment illustrated in FIGS. 6 and 7, the electric motor 103 comprises two Hall effect sensors 27a and 27b associated with one control magnet 29 on which the number of magnetic poles is equal to three times the number of magnetic poles of the rotor 15 and is therefore similar to the control magnet 29 of the first embodiment.

In the present case, the number of poles of the control magnet 29 therefore comprises six magnetic poles as represented in FIG. 6. The two Hall effect sensors 27a and 27b are, for example, arranged around the rotor 15 and offset by an angular position such that the signals deriving from the two Hall effect sensors 27a and 27b are offset by an electrical 90° angle, that is to say a 30° offset in the case of a control magnet 29 comprising three pairs of magnetic poles.

The electric motor 103 is otherwise similar to the first embodiment and only the differences in operation will now be described.

The electric motor 103 is configured so that the changes of state of the signal supplied by one of the two Hall effect sensors 27a or 27b, for example the sensor 27b, correspond to the changes of switching of the inverter 19 as represented in the graph of FIG. 7.

The two Hall effect sensors 27a and 27b arranged at 30° therefore make it possible to obtain a detection of the position of the rotor 15 every 30°.

The six steps corresponding to the switching cycle of the electromagnetic excitation coils 17 are also represented in the bottom part of FIG. 7.

Thus, one of the Hall effect sensors, for example the sensor 27b, makes it possible to supply the instants of changes of switching of the inverter 19 as in the first embodiment, and the other Hall effect sensor, for example the sensor 27a, makes it possible to obtain the direction of rotation of the rotor 15.

The measured back-electromotive forces can also be used to determine the position of the rotor 15 and to correct and/or to calibrate the Hall effect sensors 27a and 27b.

C) THIRD EMBODIMENT

Two Hall Effect Sensors 27a and 27b According to a Second Configuration.

Figure 8A:
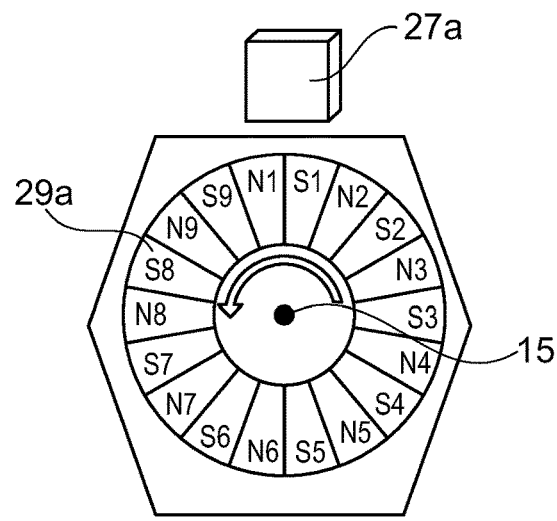
FIG. 8a represents a first Hall effect sensor associated with a first control magnet according to a third embodiment.
Figure 8B:
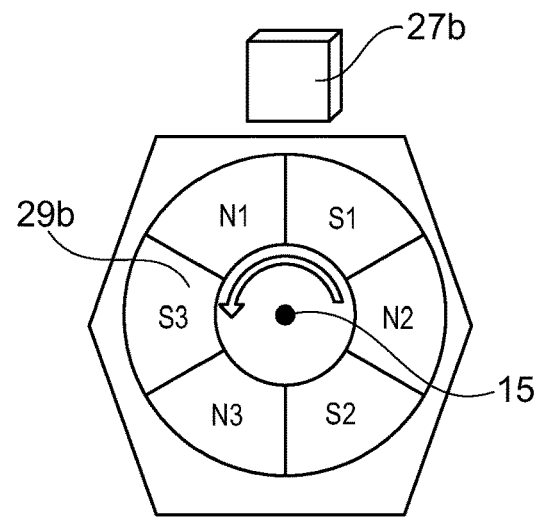
FIG. 8b represents a second Hall effect sensor associated with a second control magnet according to the third embodiment.
Figure 8C:
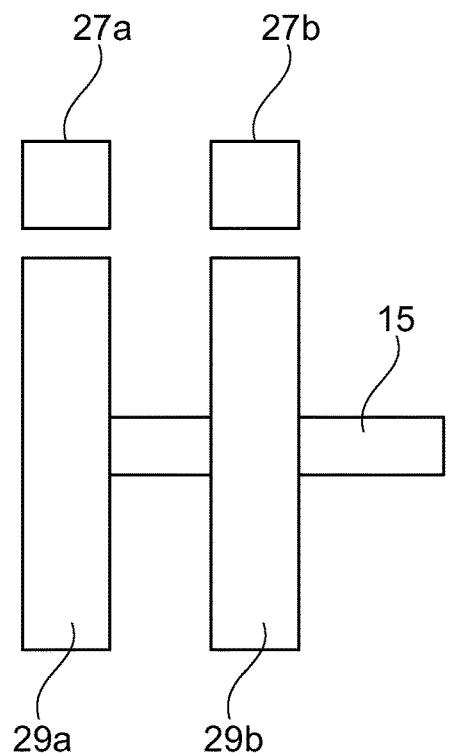
FIG. 8c represents a schematic view of the first and second Hall effect sensors associated with a first and a second control magnet and their positioning relative to the axis of the rotor.
Figure 9:
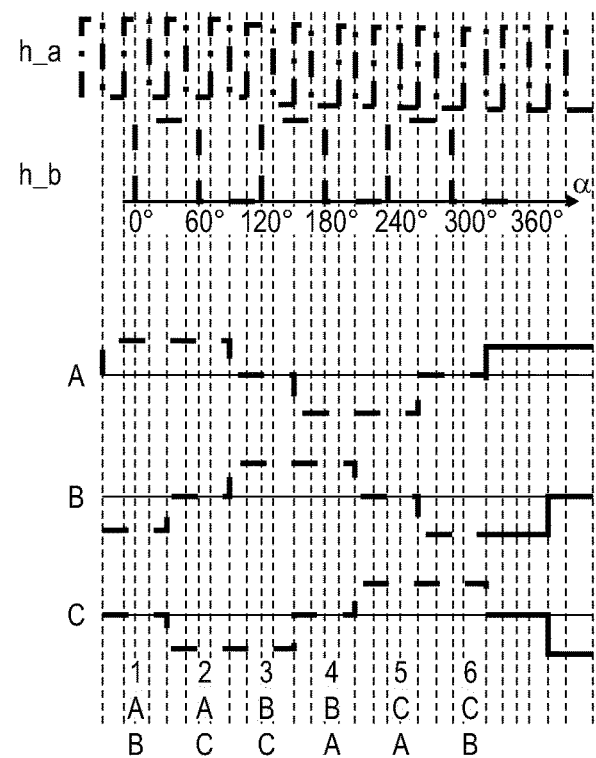
FIG. 9 represents a graph of the signals supplied by the Hall effect sensors of FIG. 8 as a function of the angular position of the rotor as well as the control signals of the electromagnetic excitation coils.

According to a third embodiment illustrated in FIGS. 8a, 8b and 9, the electric motor 103 comprises a first Hall effect sensor 27a associated with a first control magnet 29a comprising a number of pairs of magnetic poles equal to nine times the number of pairs of poles of the motor and a second Hall effect sensor 27b associated with a second control magnet 29b comprising a number of pairs of magnetic poles equal to three times the number of pairs of poles of the electric motor 103. In the present case, the number of poles of the first control magnet 29a comprises 18 magnetic poles denoted N1, N2, N3, N4, N5, N6, N7, N8 and N9 for the north poles and S1, S2, S3, S4, S5, S6, S7, S8 and S9 for the south poles as represented in FIG. 8a. Each magnetic pole of the first control magnet 29a occupies a 20° angular segment. The number of poles of the second control magnet 29b comprises six magnetic poles denoted N1, N2 and N3 for the north poles and S1, S2 and S3 for the south poles as represented in FIG. 8a. Each magnetic pole of the second control magnet 29b occupies a 60° angular segment. The first 29a and the second 29b control magnets are secured in rotation to the rotor 15 and arranged coaxially as represented in FIG. 8b.

The electric motor 103 is otherwise similar to the second embodiment and only the differences in operation will now be described.

The electric motor 103 is for example configured so that the changes of state of the signal h b supplied by the second Hall effect sensor 27b correspond to the changes of switching of the inverter 19 as represented in the graph of FIG. 9.

The first Hall effect sensor 27a and the first control magnet 29a are for example configured so that the changes of state of the second Hall effect sensor 29b occur midway in time between two changes of state of the first Hall effect sensor 27a as represented in FIG. 9.

The second Hall effect sensor 27b thus makes it possible to supply the instants of the changes of switching of the inverter 19 and the first Hall effect sensor 27a makes it possible to determine the direction of rotation of the rotor 15. The combination of the two sensors 27a and 27b makes it possible to obtain the position of the rotor every 10° or 20°.

The six steps corresponding to the switching cycle of the electromagnetic excitation coils 17 are also represented in the bottom part of FIG. 9.

As for the second embodiment, the measured back-electromotive forces can also be used to determine the position of the rotor 15 and to correct and/or calibrate the Hall effect sensors 27a and 27b.

Other embodiments comprising one or two Hall effect sensors 27, 27a, 27b associated with one or two control magnets 29, 29a, 29b comprising a greater or lesser number of magnetic poles can also be envisaged in the context of the present invention. The Hall effect sensors 27, 27a, 27b making it possible to determine the instants of switching of the inverter 19.

In practice, the device 25 for determining the angular position of the rotor 15, the control unit 21 and the processing unit 26 can be combined in a single item of equipment, for example a microprocessor, a microcontroller, an ASIC (application-specific integrated circuit) or any other suitable processing means known to the person skilled in the art.

In addition, it should be noted that the example represented for the different embodiments corresponds to an electric motor 103 with two magnetic poles and a unitary reduction ratio but the present invention is not limited to such an example but extends to other configurations having a different number of magnetic poles and a different reduction ratio.

2) Determination of the Position of the Output Shaft 109 of the Reduction Gear Mechanism 104.

As indicated previously, the position of the rotor 15 determined by the device 25 for determining the angular position of the rotor 15 is transmitted to the processing unit 26 which is configured to determine the position of the output shaft 109 of the reduction gear mechanism 104. This determination is performed by taking account of the reduction ratio of the reduction gear mechanism 104, for example 1/69, such that 69 revolutions of the rotor 15 correspond to one revolution of the output shaft 109 of the reduction gear mechanism 104. The determined position of the output shaft 109 of the reduction gear mechanism 104 makes it possible to estimate the position of the wiper arm 114 and thus define the instants when the speed of rotation must be reduced and the instants when the direction of rotation of the electric motor 103 must be reversed for the wiper arm to describe the desired reciprocating movement. The processing unit 26 is therefore coupled to the control unit 21 to generate the control signals that make it possible to obtain a change in the direction of rotation of the electric motor 103 at a predefined position of abutment of the output shaft 109 of the reduction gear mechanism 104.

Figure 10:
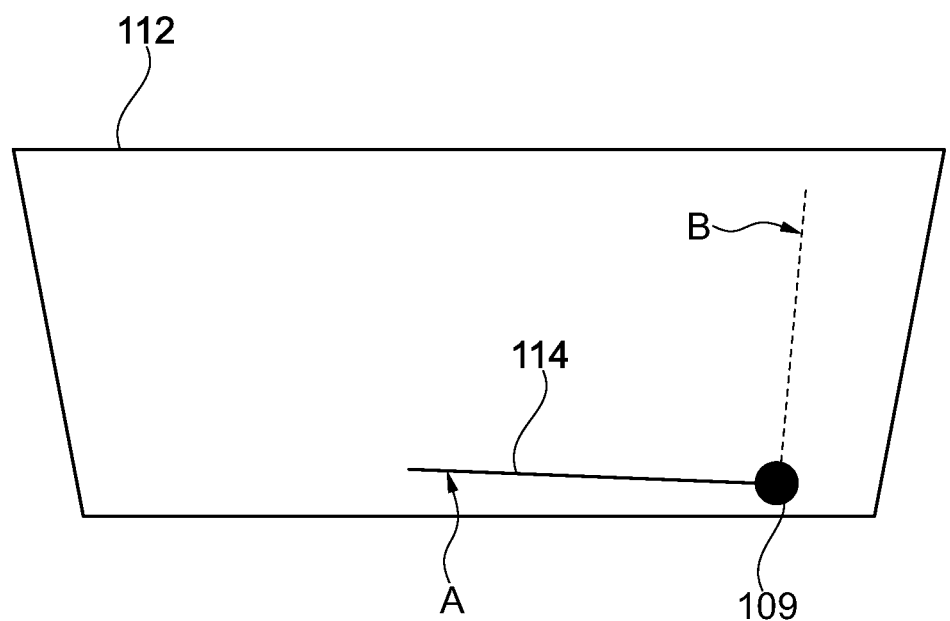
FIG. 10 shows a schematic representation of a windscreen is the positions of abutment of a wiper arm.

The mechanism comprises, for example, two positions of abutment denoted A and B as represented in FIG. 10. A first position of abutment A corresponds for example to a low position of the wiper arm close to the bottom edge of the windshield 112 or of the window associated with the wiper arm 114. The second position of abutment B corresponds for example to a high position of change of direction of the wiper arm 114 when the latter is operating.

Thus, on the basis of the signals deriving from the Hall effect sensor or sensors 17, 27a, 27b, the processing unit 26 can determine the number of revolutions performed by the rotor 15 and deduce therefrom the position of the wiper arm 114 on the basis of the reduction ratio.

However, such an operation may not be satisfactory, particularly if the wiper arm 114 is not returned to a predetermined position of rest, for example the position A each time the wiper system is deactivated. In effect, it is necessary for the control unit 11 to know the position of the wiper arm 114 when the wiper system is activated to be able to correctly control the electric motor 113 of the gear motor 101.

For that, it is possible to use at least one additional Hall effect sensor called output sensor associated with one or more control magnets called output magnets coupled in rotation to the output shaft 109 of the reduction gear mechanism 104. The sensor or sensors and the output magnet or magnets make it possible for example to determine the positions of abutment. The output sensor or sensors are for example connected to the processing unit 26.

Figure 11A:
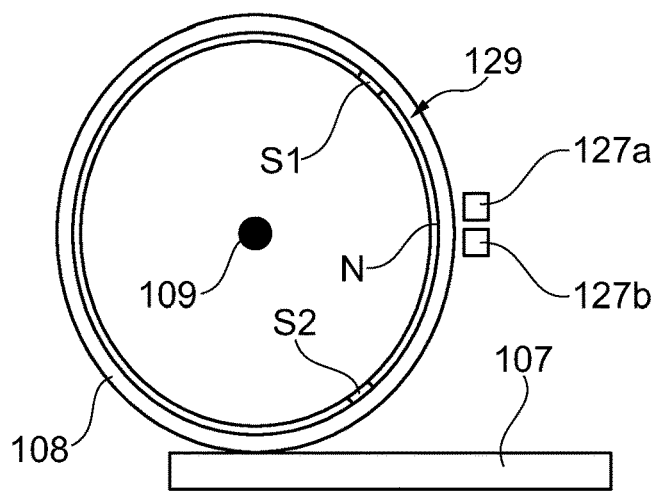
FIGS. 11a, 11b and 11c represent a reduction gear mechanism comprising two Hall effect sensors arranged at the level of its toothed wheel in three distinct positions.

FIG. 11a represents an exemplary embodiment comprising two output Hall effect sensors 127a and 127b and one control magnet 129 comprising two south poles S1 and S2 situated at the positions of abutment of the toothed wheel 108 associated with the output shaft 109 and one north pole N situated between the two south poles S1 and S2.

Figure 11B:
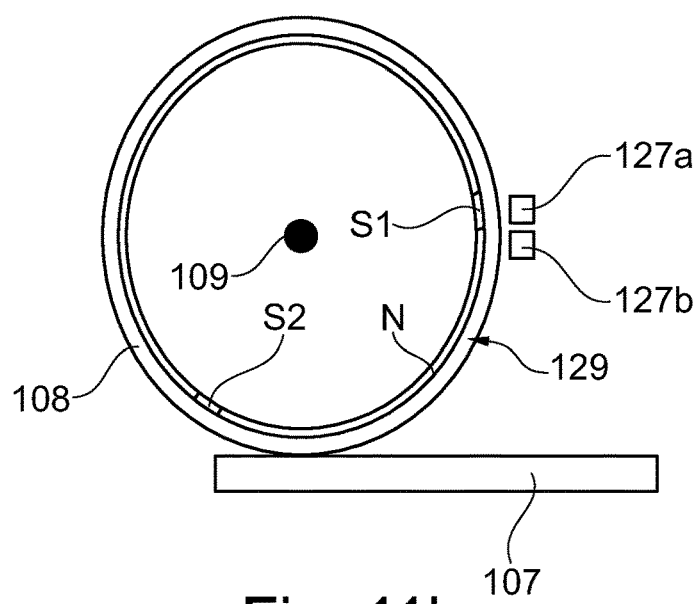
Figure 11C:
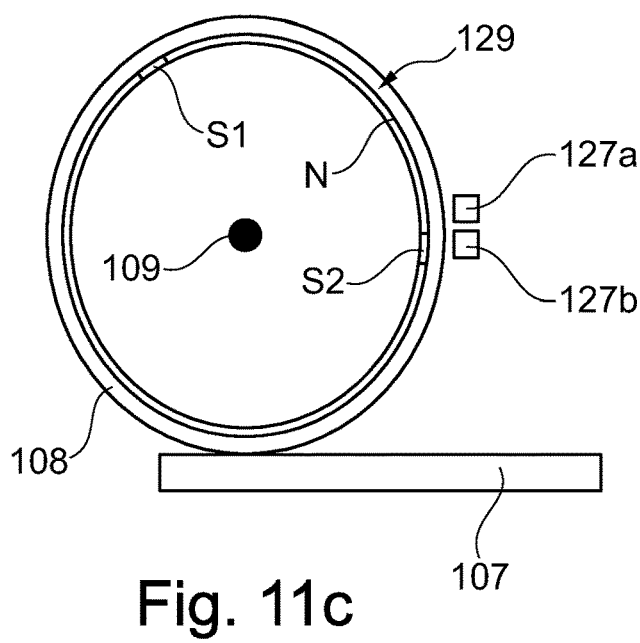

FIGS. 11b and 11c represent the toothed wheel 108 respectively in a first and a second position of abutment. The use of two Hall effect sensors 127a and 127b makes it possible to detect the presence of an abutment and to determine whether it is the first or the second abutment. In effect, when the toothed wheel 108 is in the first position of abutment (FIG. 11b), the first output sensor 127a is facing the south pole S1 and the second output sensor 127b is facing the north pole N whereas, in the second position of abutment (FIG. 11c), the first output sensor 127a is facing the north pole N and the second output sensor 127b is facing the south pole S2. Thus, depending on whether a south pole is detected by the first 127a or the second 127b output sensor, it is possible to determine whether the wiper arm is in the first or the second position of abutment. Furthermore, in the operation of the wiper system, the processing unit 26 can determine the position of the wiper arm between the two positions of abutment given by the output sensors 127a, 127b by virtue of the Hall effect sensor(s) 27, 27a, 27b associated with the rotor 15 as described previously.

Thus, the present invention makes it possible to reliably drive a gear motor 101 by using a restricted number of Hall effect sensors 27, 27a, 27b, 127a, 127b. These Hall effect sensors 27, 27a, 27b, 127a, 127b make it possible to determine both the position of the rotor 15 of the electric motor 103 and the position of the output shaft 109 of the reduction gear mechanism 104.

The invention claimed is:

1. A gear motor for a wiper system, comprising:
 a brushless DC electric motor comprising:
  a rotor,
  a stator having electromagnetic excitation coils for electromagnetically exciting the rotor,
  at least one Hall effect sensor associated with a control magnet secured in rotation to the rotor for determining an angular position of the rotor relative to the stator,
 a control unit configured to generate control signals for powering the electromagnetic excitation coils as a function of the angular position of the rotor determined by the at least one Hall effect sensor for determining the angular position of the rotor, a reduction gear mechanism linked to the rotor of the electric motor and to an output shaft configured to be linked to the wiper system, the reduction gear mechanism having a predefined reduction ratio; and a processing unit connected to the at least one Hall effect sensor for determining the angular position of the rotor and configured to determine the angular position of the output shaft on a basis of the angular position of the rotor determined by taking account of the predefined reduction ratio of the reduction gear mechanism;

wherein the control magnet comprises a number of pairs of poles greater than the number of pairs of magnetic poles of the rotor of the brushless DC electric motor, and wherein the at least one Hall effect sensor associated with the control magnet comprises a single Hall effect sensor associated with the control magnet comprising a number of pairs of poles equal to three times the number of pairs of magnetic poles of the rotor of the electric motor, the poles of the control magnet being configured to be in phase with the magnetic poles of the rotor of the electric motor so that changes of states of the at least one Hall effect sensor are synchronized with changes of state of the control signals generated by the control unit for powering the electromagnetic excitation coils.

2. The gear motor as claimed in claim 1, wherein the at least one Hall effect sensor associated with the control magnet is configured to:

determine the angular position of the rotor on the basis of signals from the at least one Hall effect sensor for speeds of rotation of the rotor below a predetermined threshold, and determine the angular position of the rotor on the basis of a measurement of a plurality of back-electromotive forces deriving from the electromagnetic excitation coils for speeds of rotation of the rotor equal to or above the predetermined threshold.

3. The gear motor as claimed in claim 2, wherein the back-electromotive force of at least one unpowered electromagnetic excitation coil is measured and transmitted to the at least one Hall effect sensor associated with the control magnet, said at least one Hall effect sensor associated with the control magnet uses the processing unit to compare the measured value of the back-electromotive force to a predetermined threshold associated with a predetermined position of the rotor.

4. The gear motor as claimed in claim 2, wherein the at least one Hall effect sensor associated with the control magnet uses the processing unit to correct a measurement of the angular position deriving from the at least one Hall effect sensor on the basis of the measurement of the plurality of back-electromotive forces of the electromagnetic excitation coils so as to calibrate the at least one Hall effect sensor on the basis of the measurements of the plurality of back-electromotive forces.

5. The gear motor as claimed in claim 1, further comprising an output magnet secured in rotation to the output shaft and at least one additional Hall effect sensor called at least one output sensor associated with the output magnet, the at least one output sensor and the output magnet being configured so that the at least one output sensor detects a first position of the output magnet corresponding to a first position of abutment of an external mechanism intended to be linked to the output shaft and a second position of the output magnet corresponding to a second position of abutment of the external mechanism intended to be linked to the output shaft, the at least one output sensor being connected to the control unit and said control unit being configured to generate the control signals as a function also of signals from the at least one output sensor.

6. A wiper system for a motor vehicle, comprising a gear motor as claimed in claim 1.

7. A control method for controlling an electric motor of a gear motor for wiper systems, the gear motor comprising:

a brushless DC electric motor comprising:
a rotor,
a stator having electromagnetic excitation coils for electromagnetically exciting the rotor,
a reduction gear mechanism linked on one side to the rotor of the electric motor and on another side to an output shaft intended to be linked to a wiper system, the reduction gear mechanism having a predefined reduction ratio, at least one Hall effect sensor associated with a control magnet secured in rotation to the rotor for determining an angular position of the rotor relative to the stator, wherein the control magnet comprises a number of pairs of poles greater than the number of pairs of magnetic poles of the rotor of the brushless DC electric motor, and wherein the at least one Hall effect sensor associated with the control magnet comprises a single Hall effect sensor associated with a control magnet comprising a number of pairs of poles equal to three times the number of pairs of magnetic poles of the rotor of the electric motor, the poles of the control magnet being configured to be in phase with the magnetic poles of the rotor of the electric motor so that changes of states of the single Hall effect sensor are synchronized with changes of state of control signals generated by a control unit for powering the electromagnetic excitation coils;

said control method comprising:

for speeds of rotation of the rotor below a predetermined threshold:
determining the angular position of the rotor on a basis of signals deriving from the at least one Hall effect sensor, for speeds of rotation of the rotor equal to or above the predetermined threshold:
determining the angular position of the rotor on the basis of a measurement of a plurality of back-electromotive forces deriving from the electromagnetic excitation coils;

generating control signals for powering the electromagnetic excitation coils as a function of the angular position of the rotor; and determining the angular position of the output shaft on the basis of the angular position of the rotor and by taking account of the predefined reduction ratio of the reduction gear mechanism.

8. The control method as claimed in claim 7, wherein an angular measurement of the single Hall effect sensor is corrected on the basis of the measurement of the plurality of back-electromotive forces deriving from the electromagnetic excitation coils for electromagnetically exciting the rotor.

9. The control method as claimed in claim 7, wherein the gear motor further comprises:

at least one output magnet arranged on the output shaft of the reduction gear mechanism, and at least one additional Hall effect sensor called at least one output sensor associated with the at least one output magnet, the at least one output sensor and the at least one output magnet being configured so that the at least one output sensor detects a first position of the at least one output magnet when the output shaft is in a first position corresponding to a first position of abutment of an external mechanism intended to be linked to the output shaft, and detects a second position of the at least one output magnet when the output shaft is in a second position corresponding to a second position of abutment of the external mechanism intended to be linked to the output shaft, and wherein a step of generation of the control signals for powering the electromagnetic excitation coils is performed also as a function of the signals from said at least one output sensor.

10. A gear motor for a wiper system, comprising:
a brushless DC electric motor comprising:
   a rotor,
   a stator having electromagnetic excitation coils for electromagnetically exciting the rotor,
   at least one Hall effect sensor associated with a control magnet secured in rotation to the rotor for determining an angular position of the rotor relative to the stator,
   a control unit configured to generate control signals for powering the electromagnetic excitation coils as a function of the angular position of the rotor determined by the at least one Hall effect sensor for determining the angular position of the rotor,
   a reduction gear mechanism linked to the rotor of the electric motor and to an output shaft configured to be linked to the wiper system, the reduction gear mechanism having a predefined reduction ratio; and
a processing unit connected to the at least one Hall effect sensor for determining the angular position of the rotor and configured to determine the angular position of the output shaft on a basis of the angular position of the rotor determined by taking account of the predefined reduction ratio of the reduction gear mechanism;
wherein the control magnet comprises a number of pairs of poles greater than the number of pairs of magnetic poles of the rotor of the brushless DC electric motor, and
wherein the at least one Hall effect sensor associated with the control magnet comprises two Hall effect sensors associated with the control magnet comprising a number of pairs of poles equal to three times the number of pairs of magnetic poles of the rotor of the electric motor, the two Hall effect sensors being offset by an angle of 30°, the magnetic poles of the rotor of the control magnet being configured to be in phase with the magnetic poles of the rotor so that changes of states of one of the two Hall effect sensors are synchronized with changes of state of the control signals generated by the control unit for powering the electromagnetic excitation coils.

11. The gear motor as claimed in claim 10, wherein the at least one Hall effect sensor associated with the control magnet is configured to:
   determine the angular position of the rotor on the basis of signals from the at least one Hall effect sensor for speeds of rotation of the rotor below a predetermined threshold, and
   determine the angular position of the rotor on the basis of a measurement of a plurality of back-electromotive forces deriving from the electromagnetic excitation coils for speeds of rotation of the rotor equal to or above the predetermined threshold.

12. The gear motor as claimed in claim 11, wherein the back-electromotive force of at least one unpowered electromagnetic excitation coil is measured and transmitted to the at least one Hall effect sensor associated with the control magnet, said at least one Hall effect sensor associated with the control magnet uses the processing unit to compare the measured value of the back-electromotive force to a predetermined threshold associated with a predetermined position of the rotor.

13. The gear motor as claimed in claim 11, wherein the at least one Hall effect sensor associated with the control magnet uses the processing unit to correct a measurement of the angular position deriving from the at least one Hall effect sensor on the basis of the measurement of the plurality of back-electromotive forces of the electromagnetic excitation coils so as to calibrate the at least one Hall effect sensor on the basis of the measurements of the plurality of back-electromotive forces.

14. The gear motor as claimed in claim 10, further comprising an output magnet secured in rotation to the output shaft and at least one additional Hall effect sensor called at least one output sensor associated with the output magnet, the at least one output sensor and the output magnet being configured so that the at least one output sensor detects a first position of the output magnet corresponding to a first position of abutment of an external mechanism intended to be linked to the output shaft and a second position of the output magnet corresponding to a second position of abutment of the external mechanism intended to be linked to the output shaft, the at least one output sensor being connected to the control unit and said control unit being configured to generate the control signals as a function also of signals from the at least one output sensor.

15. A gear motor for a wiper system, comprising:
a brushless DC electric motor comprising:
   a rotor,
   a stator having electromagnetic excitation coils for electromagnetically exciting the rotor,
   at least one Hall effect sensor associated with a control magnet secured in rotation to the rotor for determining an angular position of the rotor relative to the stator,
   a control unit configured to generate control signals for powering the electromagnetic excitation coils as a function of the angular position of the rotor determined by the at least one Hall effect sensor associated with a control magnet secured in rotation to the rotor for determining the angular position of the rotor,
   a reduction gear mechanism linked to the rotor of the electric motor and to an output shaft configured to be linked to the wiper system, the reduction gear mechanism having a predefined reduction ratio; and
a processing unit connected to the at least one Hall effect sensor associated with a control magnet secured in rotation to the rotor for determining the angular position of the rotor and configured to determine the angular position of the output shaft on a basis of the angular position of the rotor determined by taking account of the predefined reduction ratio of the reduction gear mechanism;

wherein the control magnet comprises a number of pairs of poles greater than the number of pairs of magnetic poles of the rotor of the brushless DC electric motor, and wherein the at least one Hall effect sensor associated with the control magnet comprises two Hall effect sensors, a first Hall effect sensor and a second Hall effect sensor, the first Hall effect sensor being associated with a first control magnet comprising a number of pairs of poles equal to three times the number of pairs of magnetic poles of the rotor of the electric motor, the second Hall effect sensor being associated with a second control magnet comprising a number of pairs of poles equal to nine times the number of pairs of magnetic poles of the rotor of the electric motor, the poles of the first control magnet being configured to be in phase with the magnetic poles of the rotor of the electric motor so that changes of states of the first Hall effect sensor are synchronized with changes of state of the control signals generated by the control unit for powering the electromagnetic excitation coils, the second Hall effect sensor and the second control magnet being configured so that changes of state of the first Hall effect sensor occur midway in time between two changes of state of the second Hall effect sensor.

16. The gear motor as claimed in claim 15, wherein the at least one Hall effect sensor associated with the control magnet is configured to:

determine the angular position of the rotor on the basis of signals from the at least one Hall effect sensor for speeds of rotation of the rotor below a predetermined threshold, and determine the angular position of the rotor on the basis of a measurement of a plurality of back-electromotive forces deriving from the electromagnetic excitation coils for speeds of rotation of the rotor equal to or above the predetermined threshold.

17. The gear motor as claimed in claim 16, wherein the back-electromotive force of at least one unpowered electromagnetic excitation coil is measured and transmitted to the at least one Hall effect sensor associated with the control magnet, said at least one Hall effect sensor associated with the control magnet being configured to compare the measured value of the back-electromotive force to a predetermined threshold associated with a predetermined position of the rotor.

18. The gear motor as claimed in claim 16, wherein at least one Hall effect sensor associated with the control magnet uses the processing unit to correct a measurement of the angular position deriving from the at least one Hall effect sensor on the basis of the measurement of the plurality of back-electromotive forces of the electromagnetic excitation coils so as to calibrate the at least one Hall effect sensor on the basis of the measurements of the plurality of back-electromotive forces.

19. The gear motor as claimed in claim 15, further comprising an output magnet secured in rotation to the output shaft and at least one additional Hall effect sensor called at least one output sensor associated with the output magnet, the at least one output sensor and the output magnet being configured so that the at least one output sensor detects a first position of the output magnet corresponding to a first position of abutment of an external mechanism intended to be linked to the output shaft and a second position of the output magnet corresponding to a second position of abutment of the external mechanism intended to be linked to the output shaft, the at least one output sensor being connected to the control unit and said control unit being configured to generate the control signals as a function also of signals from said at least one output sensor.

* * * * *